(12) United States Patent
Putnam

(10) Patent No.: US 6,908,093 B1
(45) Date of Patent: *Jun. 21, 2005

(54) KINGPIN COUPLER

(76) Inventor: Rex D. Putnam, 10201 Moser Dr., Bronson, MI (US) 49028

( * ) Notice: Subject to any disclaimer, the term of this patent is extended or adjusted under 35 U.S.C. 154(b) by 16 days.

This patent is subject to a terminal disclaimer.

(21) Appl. No.: 10/288,919

(22) Filed: Nov. 6, 2002

Related U.S. Application Data

(60) Provisional application No. 60/336,942, filed on Nov. 8, 2001.

(51) Int. Cl.$^7$ ............................................ B62D 53/06
(52) U.S. Cl. ...................... 280/435; 280/436; 280/434; 280/508
(58) Field of Search .................. 280/436, 435, 280/434, 433, 477, 507, 508, 509, 514, 901, 280/432; 403/13, 315, 317, 322.4

(56) References Cited

U.S. PATENT DOCUMENTS

| | | | |
|---|---|---|---|
| 1,240,818 A | 9/1917 | Buller | |
| 2,481,481 A | 9/1949 | Wolfrum | |
| 2,676,034 A | 4/1954 | Tracey | |
| 2,772,895 A | 12/1956 | Steeves et al. | |
| 3,352,571 A | 11/1967 | Nelson | |
| 3,534,982 A * | 10/1970 | Land et al. | 280/435 |
| 3,589,754 A | 6/1971 | Randolf | |
| 3,640,549 A * | 2/1972 | Neff et al. | 280/435 |
| 3,787,076 A * | 1/1974 | Walther et al. | 280/435 |
| 3,811,706 A | 5/1974 | Tucker et al. | |
| 3,870,342 A * | 3/1975 | Baxter et al. | 280/433 |
| 4,106,793 A * | 8/1978 | Neff | 280/435 |
| 4,127,856 A | 11/1978 | Bickel | |
| 4,227,713 A | 10/1980 | Blodgett, Jr. et al. | |
| 4,258,930 A | 3/1981 | Hess | |
| 4,375,894 A * | 3/1983 | Hammonds | 280/433 |
| 4,545,596 A | 10/1985 | Luke et al. | |
| 4,572,537 A * | 2/1986 | Hattori et al. | 280/433 |
| 4,592,566 A * | 6/1986 | Inoue et al. | 280/433 |
| 4,826,199 A * | 5/1989 | Chambers | 280/434 |
| 4,962,945 A | 10/1990 | Vannoy et al. | |
| 5,183,284 A | 2/1993 | Paplinski | |
| 5,205,666 A | 4/1993 | Hollis | |
| 6,170,851 B1 * | 1/2001 | Lindenman et al. | 280/434 |
| 6,467,793 B2 * | 10/2002 | Putnam | 280/508 |

* cited by examiner

Primary Examiner—Lesley D. Morris
Assistant Examiner—Daniel Yeagley
(74) Attorney, Agent, or Firm—Mary M. Moyne; Ian C. McLeod

(57) ABSTRACT

A kingpin coupler for allowing a user to connect a trailer having a kingpin to a towing vehicle. The kingpin coupler includes a head assembly, casting, jaws and a locking slide bar. The jaws are pivotably mounted in the housing and are biased into the open position by springs. When the jaws are in the open position and the locking slide bar is unlocked, the jaws prevent the locking slide bar from moving to the closed position. When the hitch ball is moved between the jaws, the jaws move to the closed position and, the unlocked, locking slide bar automatically moves to the closed position across the front of the jaws when the jaws are in the closed position.

36 Claims, 8 Drawing Sheets

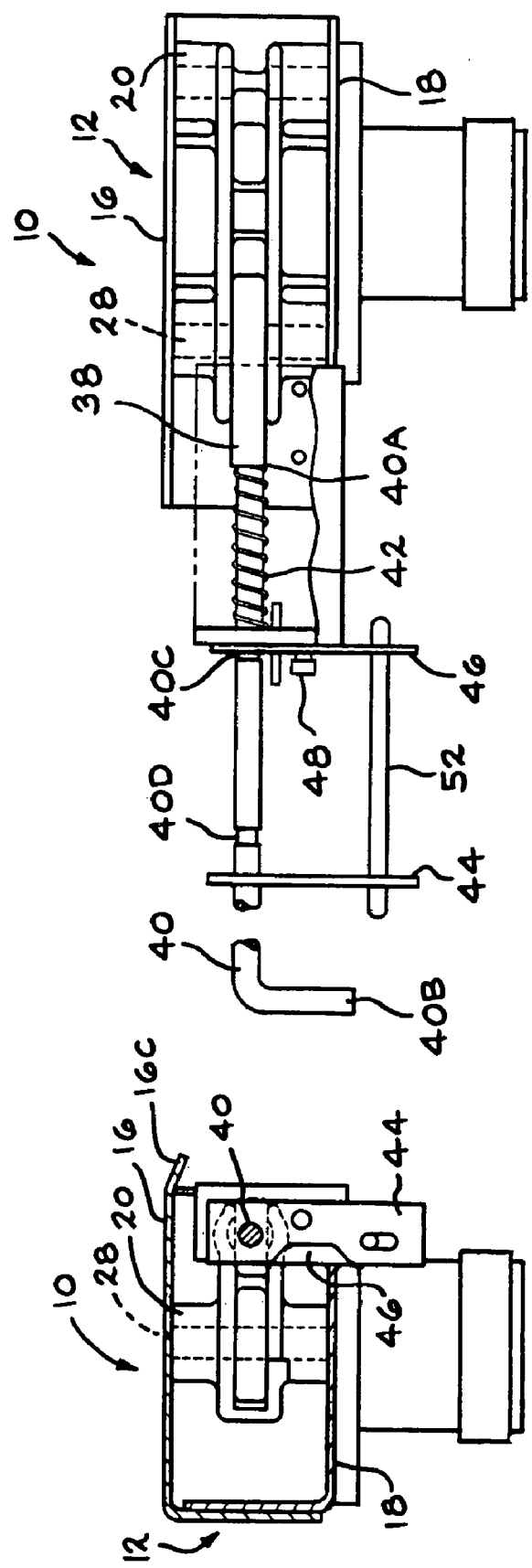

KINGPIN COUPLER

CROSS-REFERENCE TO RELATED APPLICATION

This application claims the benefit of U.S. Provisional Application Ser. No. 60/336,942, filed Nov. 8, 2001.

STATEMENT REGARDING FEDERALLY SPONSORED RESEARCH OR DEVELOPMENT

Not Applicable

BACKGROUND OF THE INVENTION (1) Field of the Invention

The present invention relates to a kingpin coupler for mounting in the bed of a pickup truck. In particular, the present invention relates to a kingpin coupler which has jaws which open and close automatically upon movement of the kingpin of the towed vehicle into and out of the jaws. The kingpin coupler also has a locking slide bar which automatically moves to a locked, closed position when the kingpin on the towed vehicle is moved between the jaws of the kingpin coupler.

(2) Description of the Related Art

The related art has shown various hitch coupling devices having jaws which close automatically around the hitch ball or pin where a locking mechanism is provided to lock the jaws in the closed position. Illustrative are U.S. Pat. Nos. 1,240,818 to Buller; 2,481,481 to Wolfrum; 2,676,034 to Tracey; 2,772,895 to Steeves et al; 3,352,571 to Nelson; 3,589,754 to Randolph; 3,811,706 to Tucker et al; 4,127,856 to Bickel; 4,227,713 to Blodgett, Jr. et al; 4,545,596 to Luke et al; 4,962,945 to Vannoy et al; 5,183,284 to Paplinksi; and 5,205,666 to Hollis.

Steeves et al describes a fifth wheel coupling having automatically opening jaws and an interlocking cross member. The cross member does not automatically move across the front of the jaws upon closing of the jaws.

Randolph shows a kingpin coupling having jaws which are locked in the closed position by blocks which engage the backs of the jaws.

Nelson describes a fifth wheel connector having jaw members and a latch bar. The jaw members are connected together by a spring which tends to pivot the jaw members into the open position. When the jaw members are in the open position, the latch bar is in the withdrawn position with the innermost corner of the latch bar connecting a notch formed in the flat wall of the adjacent jaw member. When the jaw members are moved to the closed position, the corner of the latch bar becomes disconnected with th notch in the jaw member and the spring automatically moves the latch bar inward adjacent the flat surfaces of each of the jaw members.

In particular, Buller, Tracey, Luke et al, Vannoy et al and Paplinski show hitch coupling devices having jaws which automatically pivot into a closed position as the hitch ball or pin is moved between the jaws. The jaws are locked in the closed position by a locking bar or block which is inserted between the back end of the jaws which prevents the jaws from pivoting into the open position. This type of locking mechanism is different from the locking mechanism of the present invention. In addition, the above devices do not provide a means for unlocking the locking mechanism from a distance such that a user can unlock the locking mechanism without climbing into the bed of the pickup truck.

Randolph, Wolfrum, Bickel and Blodgett, Jr. et al show hitch coupling devices having jaws which close automatically. The locking mechanism of the coupling devices also locks automatically upon closing of the jaws. However, the jaws and locking mechanism are not similar to those of the present invention. In addition, the above devices do not provide a means for unlocking the locking mechanism from a distance such that a user can unlock the locking mechanism without climbing into the bed of the pickup truck.

Only of minimal interest is U.S. Pat. No. 4,258,930 to Hess which shows an automatic hitch having a safety lock.

There remains the need for a kingpin coupler which has all the benefits of the previous devices including jaws which automatically pivot into the closed position and also has a locking mechanism which automatically moves to a locked, closed position to prevent the jaws from opening and blocks the opening in the kingpin coupler to prevent the kingpin from moving out of the kingpin coupler. Further, the kingpin coupler of the present invention allows the locking mechanism to be unlocked from a distance such that a user can unlock the kingpin coupler without having to climb into the bed of the towing vehicle.

SUMMARY OF THE INVENTION

The kingpin coupler of the present invention allows a single user to easily connect a trailer having a kingpin to a towing vehicle equipped with the kingpin coupler. The kingpin coupler is preferably installed in the bed of a pickup truck. The kingpin coupler allows for automatic locking of the kingpin coupler as soon as the kingpin is correctly positioned in the kingpin coupler. The kingpin coupler also allows for unlocking the kingpin coupler without entering the bed of the truck. When the kingpin coupler is unlocked, the jaws of the kingpin coupler open automatically when the kingpin is moved out of the notches in the casting and head assembly. The kingpin coupler includes a head assembly, casting, pivoting jaws and a locking slide bar. The top and bottom plates of the head assembly are designed to guide and accommodate the kingpin. The casting is mounted in the head assembly and has top and bottom sections. The jaws are pivotably mounted in the housing between the top and bottom sections of the casting. The jaws are pivotably mounted in the housing by pivot pins and are biased into the open position by torsion springs mounted around the pivot pins. The locking slide bar has a first end adjacent the jaws and a handle at the second end. The locking slide bar is biased toward the closed position by a spring which allows for automatic movement of the locking slide bar to the closed position. A locking lever allows the locking slide bar to be locked in the closed position or the open position. When the jaws are in the open position and the locking slide bar is unlocked, the jaws are in the path of the locking slide bar and the force of the spring tending to bias the jaws in the open position, is greater than the force tending to move the locking slide bar into the closed position. Thus, the jaws: prevent the locking slide bar from moving to the closed position. The jaws are moved to the closed position by contact of the kingpin with the front end of the jaws. When the locking slide bar is in the unlocked, open position, the locking slide bar automatically moves toward the closed position when the kingpin is moved between the jaws and the jaws move to the closed position. When the trailer is securely coupled to the towing vehicle using the kingpin coupler, the jaws of the kingpin coupler are easily unlocked from their secured position by turning the handle of the locking slide bar in a direction which frees the locking lever from the second groove in the handle. Once the locking lever is cleared from the second groove, the handle can be freely moved toward a side of the vehicle away from the jaws by a user standing on the ground surface adjacent to the side of the vehicle. The handle is moved until the locking slide bar is out of the notches of the casting and the top and bottom plate of the head assembly and the locking lever moves back into the first groove. This secures the slide bar in an open position thereby permitting the jaws to open freely as the user moves the towing vehicle away from the trailer and thus, moves the kingpin coupler away from the kingpin. In one (1) embodiment, the kingpin coupler has a hitch ball adaptor and the truck is equipped with a hitch ball assembly such as for use with a gooseneck assembly.

The present invention relates to a coupling device for mounting on a towing vehicle for connecting a towed vehicle having a kingpin to the towing vehicle, which comprises: a plate having a first end and a second end with a first surface and a second surface extending therebetween with the second surface attached to the towing vehicle; a pair of jaws each having a first end and a second end and pivotally mounted adjacent the first surface of the plate such that the first end of the jaws is adjacent the first end of the plate and a space is provided between the jaws wherein in an open position, the first ends of the jaws are spaced apart and wherein when the kingpin is moved between the spaced apart, first ends of the jaws into the space between the jaws, the kingpin contacts the jaws at the second end of the jaws and pivots the jaws into a closed position such that the first ends of the jaws move towards each other; a stop mounted adjacent the second end of the jaws such that when the jaws are in the closed position and the second ends of the jaws are spaced apart, the stop extends between the spaced apart second ends of the jaws; and a locking slide bar mounted adjacent the first ends of the jaws such that in a closed position with the jaws in the closed position, the locking slide bar extends adjacent the first ends of the jaws and prevents the jaws from pivoting into the open position.

Further, the present invention relates to a coupling device for mounting on a towing vehicle for connecting a towed vehicle having a kingpin to the towing vehicle, which comprises: a housing having an open first end and configured to be connected to the towing vehicle; a pair of jaws pivotally mounted on the housing such that when the kingpin is moved into the open first end of the housing, the kingpin contacts the jaws and pivots the jaws between an open position and a closed position wherein when in the open position, the jaws do not block the open first end of the housing and wherein in the closed position, the jaws block the open first end of the housing; a locking slide bar slidably mounted on the housing adjacent the open first end and configured to slide to a closed position across the open first end of the housing to block the open first end of the housing, wherein when the locking slide bar is in the closed position, the jaws are in the closed position and wherein in the closed position, the locking slide bar and the pair of jaws prevent the kingpin from moving out of the open first end of the housing; and a handle rotatably mounted on the locking slide bar with a locking lever connected to the handle for locking the locking slide bar in a locked, closed position or a locked, open position wherein the locking lever is moved between a locked position and an unlocked position by axially rotating the handle.

Further still, the present invention relates to a coupling device for mounting on a towing vehicle for connecting a towed vehicle having a kingpin to the towing vehicle, which comprises: a housing having an open first end and configured to be mounted on the towing vehicle; a pair of jaws pivotally mounted on the housing such that when the kingpin is moved into the open first end of the housing, the kingpin contacts the jaws and pivots the jaws between an open position and a closed position wherein when in the open position, the jaws do not block the open first end of the housing and wherein in the closed position, the jaws block the open first end of the housing; a locking slide bar slidably mounted on the housing adjacent the open first end and configured to slide to a closed position across the open first end of the housing to block the open first end of the housing, wherein when the locking slide bar is in the closed position, the jaws are in the closed position and wherein in the closed position, the locking slide bar and the pair of jaws prevent the kingpin from moving out of the open first end of the housing; and a handle rotatably mounted on the locking slide bar.

Finally, the present invention relates to a method for coupling a towed vehicle having a kingpin to a towing vehicle, which comprises the steps of: providing a coupling device mounted on the towing vehicle, the coupling device including a housing having an open, first end and configured to be mounted on the towing vehicle; a pair of jaws pivotally mounted on the housing such that when the kingpin is moved into the open, first end of the housing, the kingpin contacts the jaws and pivots the jaws between an open position and a closed position, wherein when in the open position, the jaws do not block the open first end of the housing and when in the closed position, the jaws extend around the kingpin adjacent the open first end and block the open first end of the housing; and a locking slide bar slidably mounted on the housing adjacent the open, first end and configured to slide to a closed position across the open first end of the housing to block the open first end of the housing; and moving the kingpin essentially horizontally into the open, first end of the housing of the coupling device with the jaws in the open position wherein as the kingpin contacts the jaws, the jaws pivot to the closed position and the locking slide bar moves to the closed position such that the locking slide bar prevents the kingpin from moving out of the housing when the towed vehicle is being towed.

The substance and advantages of the present invention will become increasingly apparent by reference to the following drawings and the description.

BRIEF DESCRIPTION OF THE DRAWINGS

FIG. 5 is a front view of the kingpin coupler 10 showing the locking slide bar 38 in the locked, open position.

FIG. 6 is a side view of the kingpin coupler 10 showing the locking lever 46.

DESCRIPTION OF THE PREFERRED EMBODIMENTS

Figure 1:
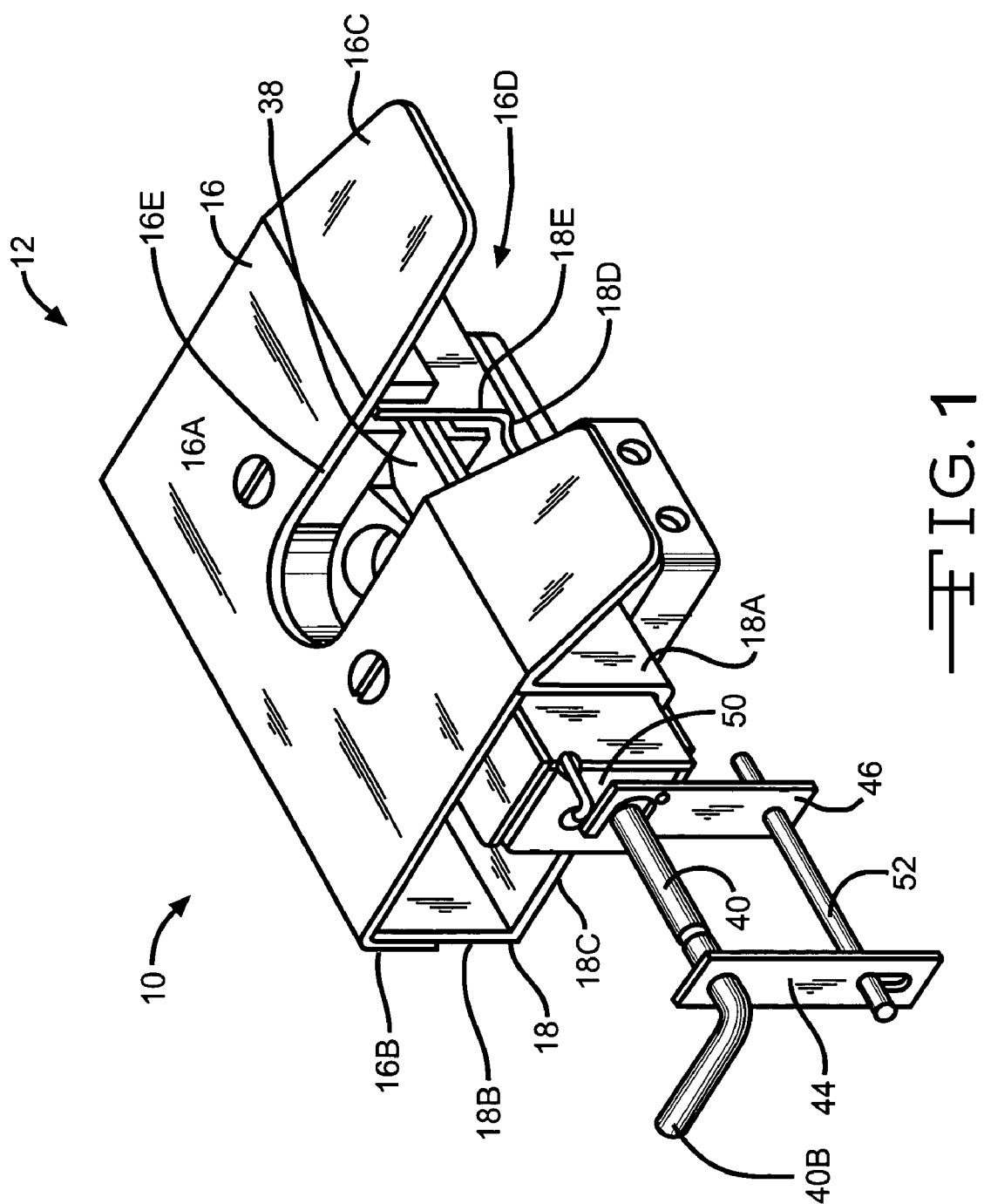
FIG. 1 is a perspective view of the kingpin coupler 10.
Figure 2:
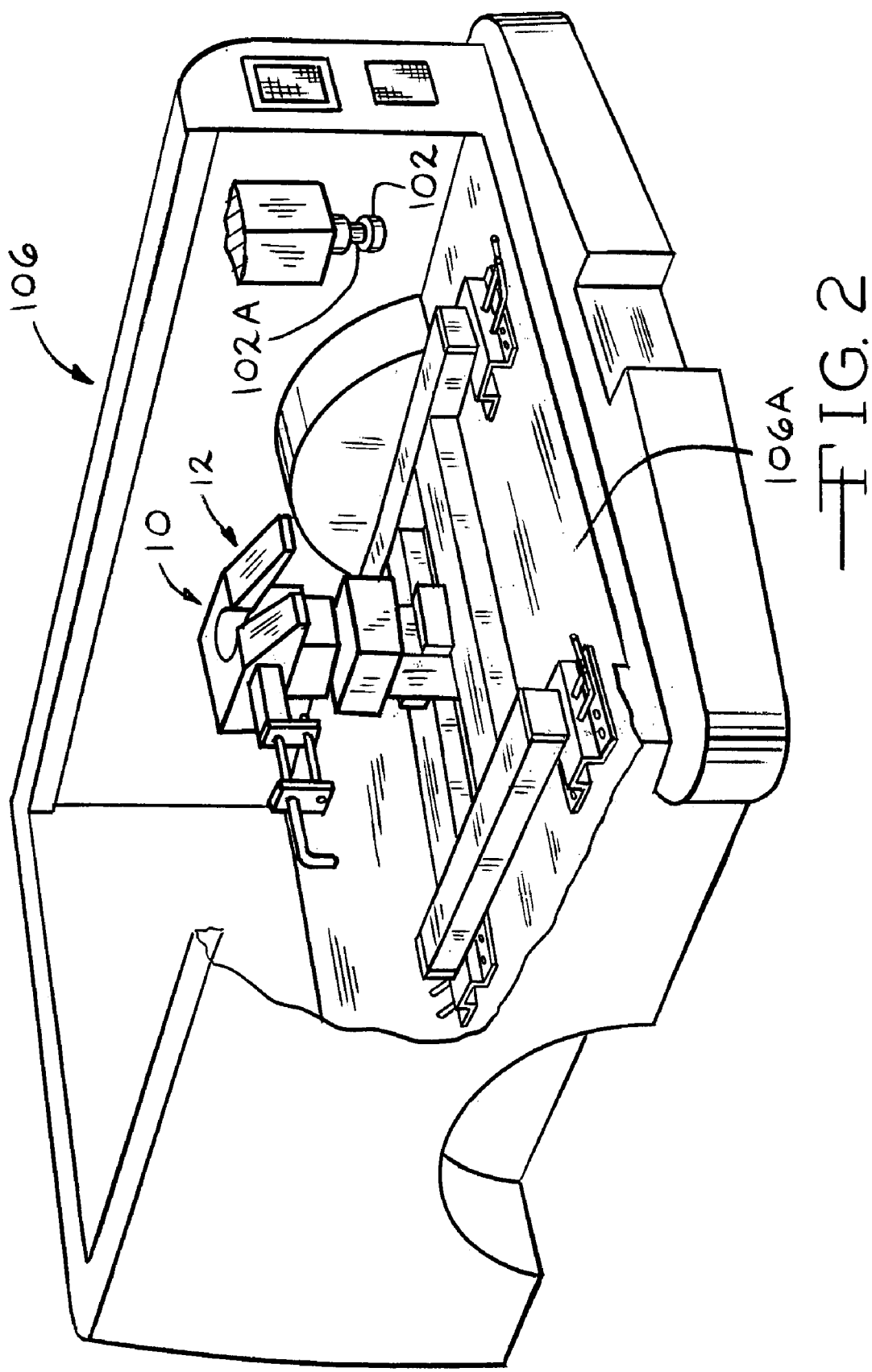
FIG. 2 is a perspective view of the kingpin coupler 10 mounted in the bed 106A of a truck 106.

The coupling device or kingpin coupler 10 of the present invention is intended to be used to allow a towing vehicle such as a pickup truck 106 to be easily and quickly connected to and disconnected from a towed vehicle such as a trailer having a kingpin 102 (FIG. 2). In one (1) embodiment, the kingpin coupler 10 is mounted on a hitch ball adaptor which mounts on a hitch ball mounted on the towing vehicle 106. The hitch ball is mounted in the bed 106A of a pickup truck 106.

The kingpin coupler 10 includes a housing or head assembly 12, a pair of jaws 24 and 26 and a locking slide bar 38. The head assembly 12 has a top plate 16 and a bottom plate 18 which are mounted together to form a center chamber therebetween. The top and bottom plates 16 and 18 are preferably mounted together in a spaced apart, parallel relationship. The top plate 16 and the bottom plate 18 can be welded as an integral unit. The plates 16 and 18 preferably have an essentially square shape. In one (1) embodiment, the top plate 16 is mounted on the base plate of the hitch ball adaptor. The top plate 16 has a top wall 16A, back sidewall 16B, and a guide flange 16C. The guide flange 16C extends along the front end of the top plate 16. The guide flange 16C extends downward and outward from the top plate 16 in a direction toward the bottom plate 18. The guide flange 16C has an opening 16D extending through the width of the guide flange 16C. The top wall 16A has a U-shaped notch 16E adjacent the opening 16D in the guide flange 16C. The opening 16D in the guide flange 16C has angled sides with a width greater than the width of the notch 16E in the top wall 16A. The angled sides of the opening 16D help to guide the kingpin 102 toward the center of the head assembly 12 between the jaws 24 and 26. The bottom plate 18 has a size essentially similar to the top plate 16. The bottom plate 18 has a front sidewall 18A and a back sidewall 18B which extend upward toward the top plate 16. A bottom wall 18C of the bottom plate 18 extends between the sidewalls 18A and 18B and is parallel to the top wall 16A of the top plate 16. The bottom wall 18C has a notch 18D aligned with the notch 16E in the top wall 16B of the top plate 16. The front sidewall 18A has an opening 18E spaced essentially in the center of the front sidewall 18A adjacent the notch 16E in the top wall 16A of the top plate 16 and the notch 18D in the bottom wall 18C of the bottom plate 18. A kingpin stop 22 is positioned at the closed, second end of the notches 16E and 18D in the top wall 16A of the top plate 16 and the bottom wall 18C of the bottom plate 18. The kingpin stop 22 preferably has a concave front surface such as to accommodate the shape of the outer surface of the body portion 102A of the kingpin 102.

Figure 7:
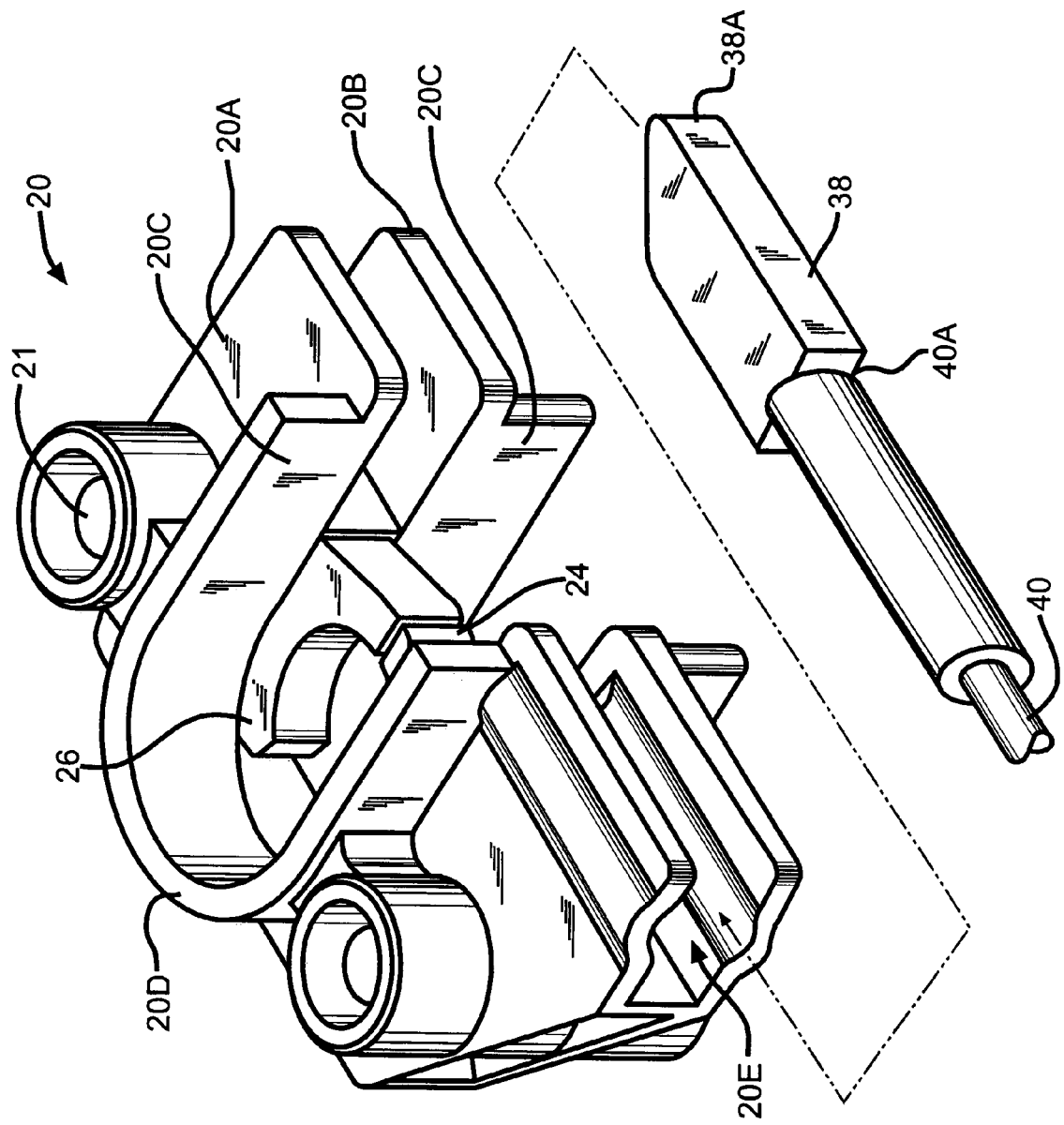
FIG. 7 is a perspective view of the casting 20 with a portion of the locking slide bar 38.

In one (1) embodiment, casting 20 is provided in the center chamber of the head assembly 12 (FIG. 7). The casting 20 has a top section 20A and a bottom section 20B. The top and bottom sections 20A and 20B are positioned such that the top and bottom sections 20A and 20B are in a spaced apart, parallel relationship. In one (1) embodiment, the top and bottom sections 20A and 20B are constructed as a unitary piece. In one (1) embodiment, the top section 20A is identical to the bottom section 20B. The top and bottom sections 20A and 20B each have a U-shaped notch 20C which is evenly spaced between the sides of the top and bottom sections 20A and 20B. The U-shaped notches 20C have an opening at the front of the casting 20. The casting 20 has bolt holes 21 adjacent each side. The bolt holes 21 allow for mounting pivot pins 28 for the jaws 24 and 26. The bolt holes 21 in the casting 20 preferably correspond to bolt holes in the top and bottom plates 16 and 18 of the head assembly 12. This allows the pivot pins 28 for mounting the jaws 24 and 26 to also be used to mount the casting 20 in the head assembly 12. Using the pivot pins 28 to mount the casting 20 in the head assembly 12 enables the casting 20 to be easily and quickly removed from the head assembly 12. The casting 20 has spacers 20D around the U-shaped notches 20C and around the bolt holes 21 to evenly space the casting 20 in the head assembly 12 between the top and bottom plates 16 and 18.

The casting 20 also includes a channel 20E along the front of the casting 20. The channel 20E allows for slidably mounting of the locking slide bar 38 in the head assembly 12 and allows the locking slide bar 38 to extend through the casting 20 and across the notches 20C of the casting 20 when the locking slide bar 38 is in the locked, closed position. In (1) one embodiment, the channel 20E of the casting 20 has a rectangular shape with an inner chamber having a square cross-section. The front side of the channel 20E is preferably open. The inner chamber has a groove along the center to reduce the amount of friction between the locking slide bar 38 and the channel 20E as the locking slide bar 38 moves. In one (1) embodiment, the center groove has a semi-circular shape similar to the shape of the first end 40A of the handle 40 of the locking slide bar 38. A side section is provided on the head assembly 12 adjacent the end of the channel 20E. The side section provides support for the handle 40 of the locking slide bar 38 and the spring 42 positioned around the handle 40.

The jaws 24 and 26 have a first or front end 24A and 26A and a second or back end 24B and 26B with an outer side 24C and 26C and an inner side 24D and 26D extending therebetween. The jaws 24 and 26 are mounted in the center chamber of the head assembly 12. The jaws 24 and 26 are held in place in the head assembly 12 by the casting 20. The jaws 24 and 26 are spaced between the top and bottom sections 20A and 20B of the casting 20. The top and bottom sections 20A and 20B of the casting 20 are spaced apart a distance such that the jaws 24 and 26 are able to pivot easily between the sections 20A and 20B. The jaws 24 and 26 are positioned such that in the closed position, the first ends 24A and 26A of the jaws 24 and 26 extend across and close off the opening of the notches 16E, 18D and 20C in the top wall 16A of the top plate 16, the bottom wall 18C of the bottom plate 18 and the top and bottom sections 20A and 20B of the casting 20 and the outer side 24C and 26C is adjacent the locking slide bar 38. In the open position, the jaws 24 and 26 are completely removed from the notches 16E, 18D and 20C. The first and second jaws 24 and 26 are pivotally mounted on pivot pins 28 between the top plate 16 and bottom plate 18 and top and bottom sections 20A and 20B of the casting 20. The pivot pins 28 are preferably positioned adjacent the second end 24B and 26B of the jaws 24 and 26. In one (1) embodiment, the pivot pins 28 extend essentially perpendicular to the plates 16 and 18 and extend completely through the head assembly 12, the casting 20 and the jaws 24 and 26. The jaws 24 and 26 are preferably identical and are mounted such as to be mirror images of each other. The first end 24A and 26A of the jaws 24 and 26 have a curved, concave shape to accept the cylindrical body portion 102A of the kingpin 102. The outer side 24C and 26C of the jaws 24 and 26 are provided with a groove 24E and 26E which engage a stop 20F on the casting 20 which stops the opening movement of the jaws 24 and 26 beyond the desired, fully open position. Each jaw 24 or 26 is provided with a spring 30 mounted around the pivot pin 28. The springs 30 are preferably torsion springs which act to bias the jaws 24 and 26 into the open position. In the open position, the front end 24A and 26A of the jaws 24 and 26 are spaced apart at least the diameter of a body portion 102A of the kingpin 102 and do not extend into the notches 20C in the casting 20. In the closed position, the front ends 24A and 26A of the jaws 24 and 26 meet essentially in the center of the notches 20C in the top and bottom sections 20A and 20B of the casting 20. In the closed position, the curved, first ends 24A and 26A of the jaws 24 and 26 form a center opening which represents approximately 80% of a circle. In the one (1) embodiment, the front ends 24A and 26A of the jaws 24 and 26 are slightly spaced apart from each other when the jaws 24 and 26 are in the closed position.

The locking slide bar 38 is slidably mounted in the channel 20E of the casting 20 and has a handle 40 at the second end 38B. The locking slide bar 38 preferably has a rectangular shape with a square cross-section and opposed first and second ends 38A and 38B. However, the cross-sectional shape of the locking slide bar 38 is preferably similar to the cross-sectional shape of the channel 20E of the casting 20. The locking slide bar 38 is of a size so as to easily slide within the channel 20E of the casting 20. The first end 38A of the locking slide bar 38 is preferably angled such that the front edge is longer than the back edge. In one (1) embodiment, the locking slide bar 38 has an inner bore which extends partially into the locking slide bar 38. The inner bore has an opening at the second end 38B of the locking slide bar 38. The first end 40A of the handle 40 is rotatably mounted in the inner bore of the locking slide bar 38 at the second end 38B. In another embodiment, the first end 40A of the handle 40 is rotatably mounted on the second end 38B of the locking slide bar 38. The handle 40 extends outward from the locking slide bar 38 through an opening in a bracket 50 which is mounted between the top and bottom plates 16 and 18 of the head assembly 12 adjacent the channel 20E. The handle 40 preferably has a cylindrical shape. The second end 40B of the handle 40 is preferably L-shaped to allow for grasping the handle 40 to move the locking slide bar 38. A spring 42 is mounted around the handle 40 inside the side section of the head assembly 12. In one (1) embodiment, the spring 42 extends between the bracket 50 and the second end 38B of the locking slide bar 38. The spring 42 can be a compression spring. The handle 40 has a first concentric groove 40C adjacent the locking slide bar 38 and a second concentric groove 40D adjacent the L-shaped second end 40B of the handle 40. A trip lever 44 is mounted on the handle 40 between the second concentric groove 40D and the second end 40B of the handle 40. The trip lever 44 extends outward from the handle 40 and has a connector slot to allow for connection of the trip lever rod 52.

A locking lever 46 is mounted on the bracket 50 through which the handle 40 extends. In one (1) embodiment, the locking lever 46 is pivotally mounted to the bracket 50 by a pivot pin 48. The locking lever 46 has a first end, a second end and a central pivot hole which allows the lever 46 to be pivotally mounted by the pivot pin 48 to the bracket 50. The first end of the locking lever 46 has a hook-like shape with an inner side having a concave shape. The second end of the locking lever 46 has a connector slot. In one (1) embodiment, a trip lever rod 52 is inserted through the connector slot of the locking lever 46 and connects to the slot of the trip lever 44. The locking lever 46 is mounted such that the first end is adjacent the handle 40. A torsion spring 54 is mounted on the pivot pin 48 for the locking lever 46 and tends to bias the locking lever 46 toward the handle 40 and into the locked position.

Figure 3:
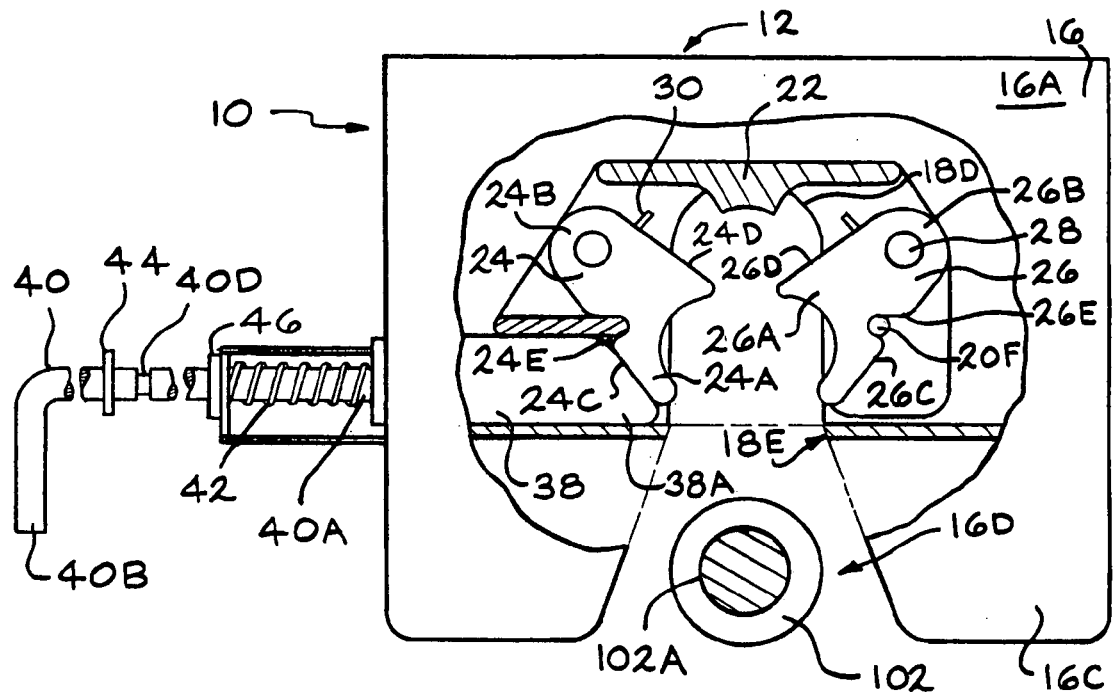
FIG. 3 is a top view of the kingpin coupler 10 with a cut away portion showing the jaws 24 and 26 in the open position.
Figure 9:
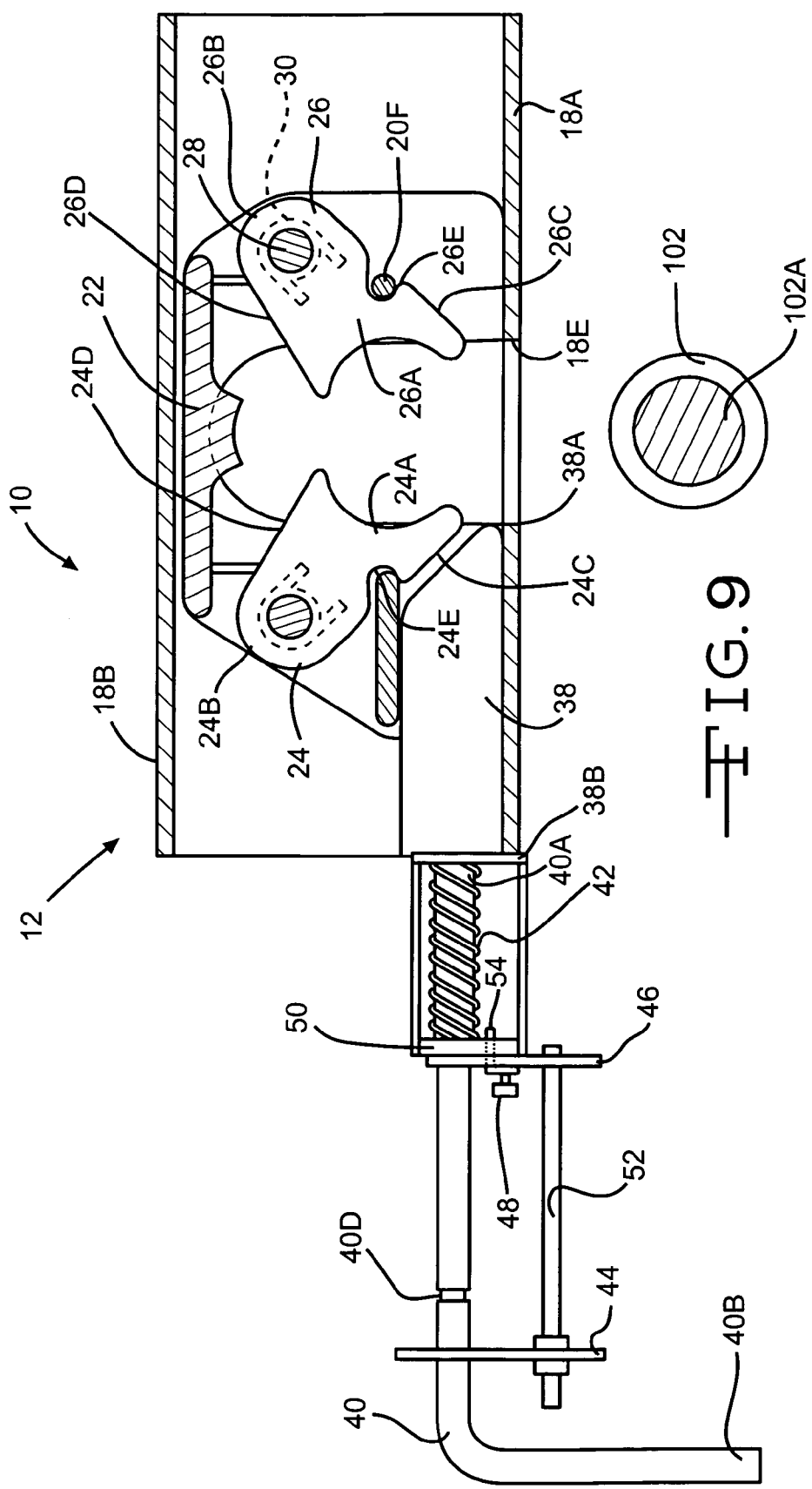
FIG. 9 is a cross-sectional view showing the locking slide bar 38 in the open, locking position.
Figure 10:
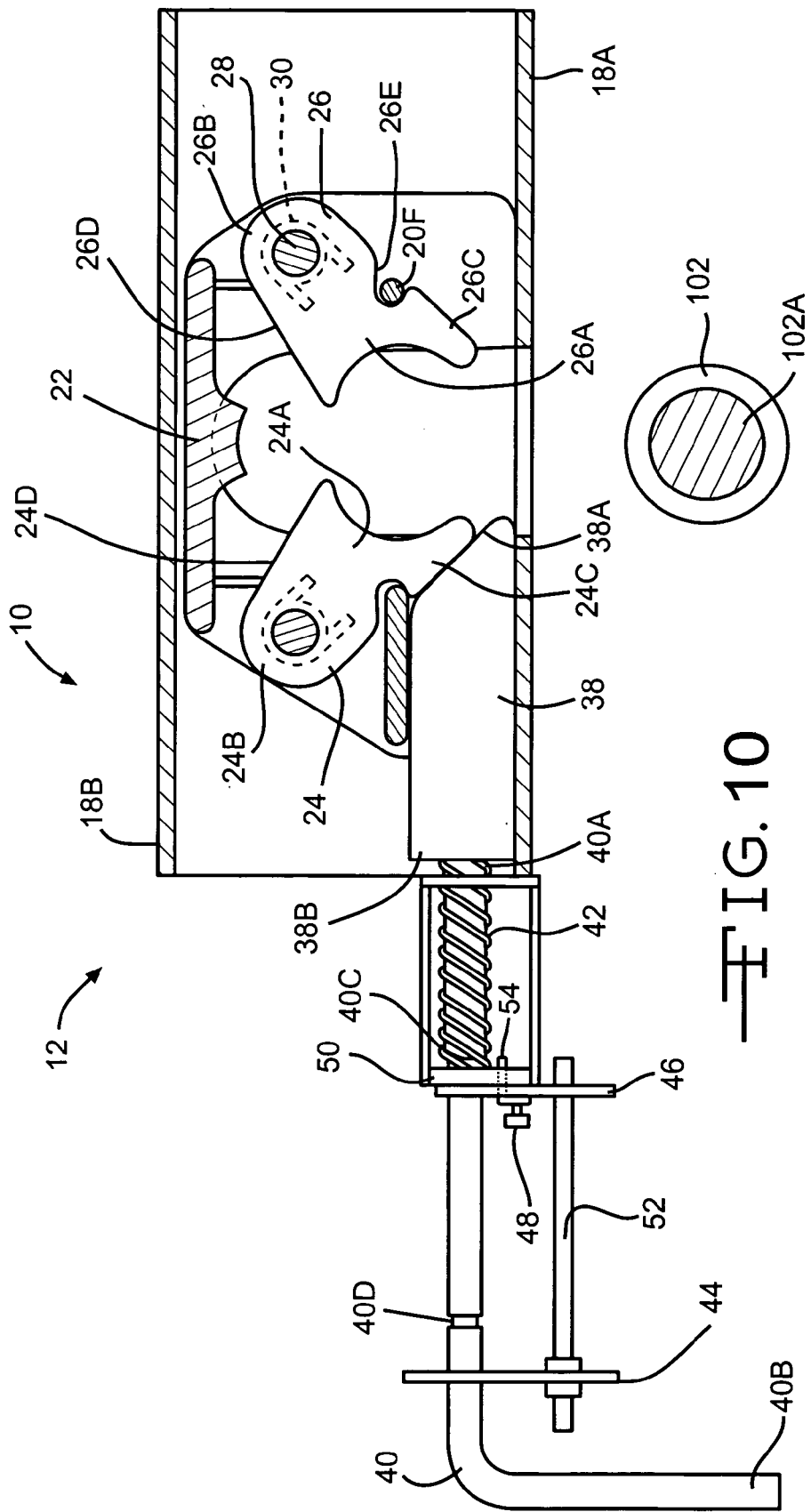
FIG. 10 is a cross-sectional view showing the locking slide bar 38 in the open, unlocked position.

Prior to use, the kingpin coupler 10 is preferably in the storage position with the jaws 24 and 26 in the fully open position and the locking mechanism in the open, locked position (FIG. 9). In the open, locked position, the locking slide bar 38 of the locking mechanism does not extend into or across the open end of the notches 16E, 18D and 20C and the first end of the locking lever 46 is in the first concentric groove 40C of the handle 40 of the locking slide bar 38. In one (1) embodiment, when the locking slide bar 38 is in the open, locked position, the first end 38A of the locking slide bar 38 is adjacent the notches 16E, 18D and 20C. To use the kingpin coupler 10, the locking mechanism is first unlocked. To unlock the locking mechanism, the handle 40 of the locking slide bar 38 is rotated axially about a longitudinal axis A—A of the locking slide bar 38 by rotating the second handle end 40B. As the handle 40 is rotated, the locking lever 46 is pivoted from the locked position to the unlocked position due to the connection of the trip lever rod 52 between the trip lever 44 on the handle 40 and the second end of the locking lever 46. As the locking lever 46 is moved from the locked to the unlocked position, the locking lever 46 moves out of the first concentric groove 40C in the handle 40. When the locking lever 46 moves out of the first concentric groove 40C, the locking slide bar 38 moves inward toward the notches 16E, 18D and 20C until the first end 38A of the locking slide bar 38 contacts the outer side 24C or 26C of the adjacent jaw 24 or 26 adjacent the first end 24A or 26A of the jaw 24 or 26 (FIGS. 3 and 10) depending on whether the locking slide bar 38 enters the notches 16E, 18D and 20C for the left or right side. The groove 24E or 26E on the outer side 24C or 26C of the jaws 24 and 26 prevents the jaws 24 and 26 from rotating beyond a specific point in the open direction such that the first ends 24A and 26A of the jaws 24 and 26 remain in the path of the locking slide bar 38 when the jaws 24 and 26 are in the open position. The force of the spring 30 tending to keep the jaw 24 or 26 in the open position is greater than the force of the spring 42 of the locking slide bar 38 tending to move the locking slide bar 38 into the closed position. Thus, the jaw 24 or 26 keeps the locking slide bar 38 in the open, unlocked position. The force of the locking slide bar 38 pushing on the outer side 24C or 26C of the jaw 24 or 26 may cause the jaw 24 or 26 to move slightly toward the closed position. However, the force of the spring 30 is such that the jaw 24 or 26 will not move to a position where the front end 24A or 26A of the jaw 24 or 26 interferes with the insertion of the kingpin 102 between the jaws 24 and 26.

Figure 4:
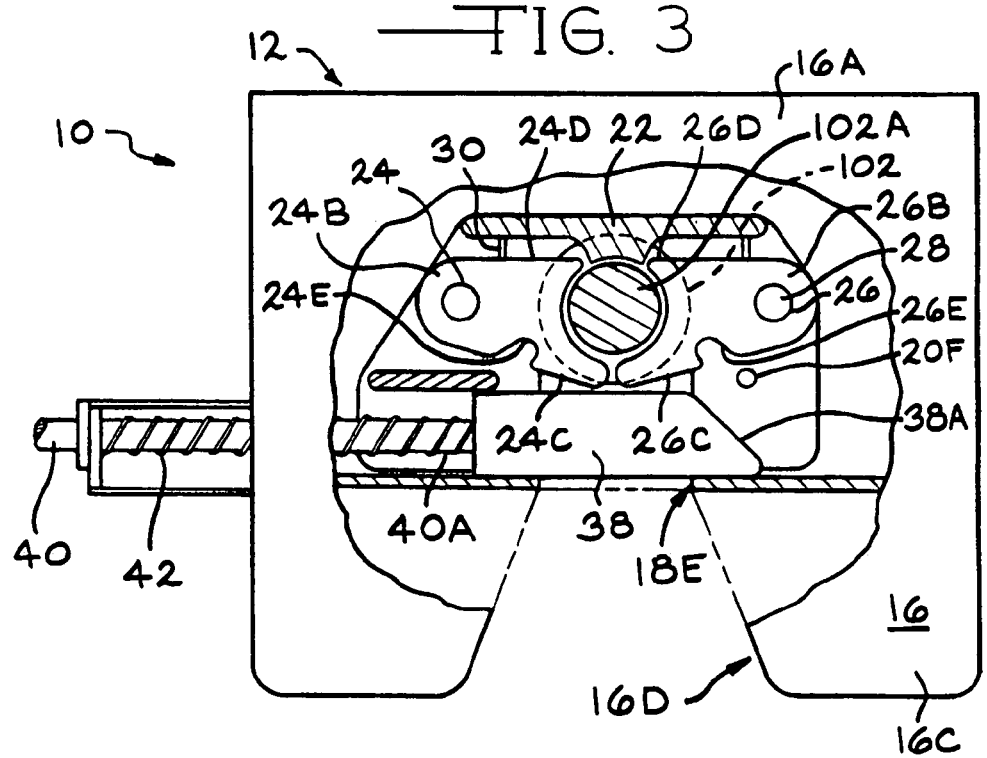
FIG. 4 is a top view of the kingpin coupler 10 with a cut away portion showing the jaws 24 and 26 in the closed position.
Figure 8:
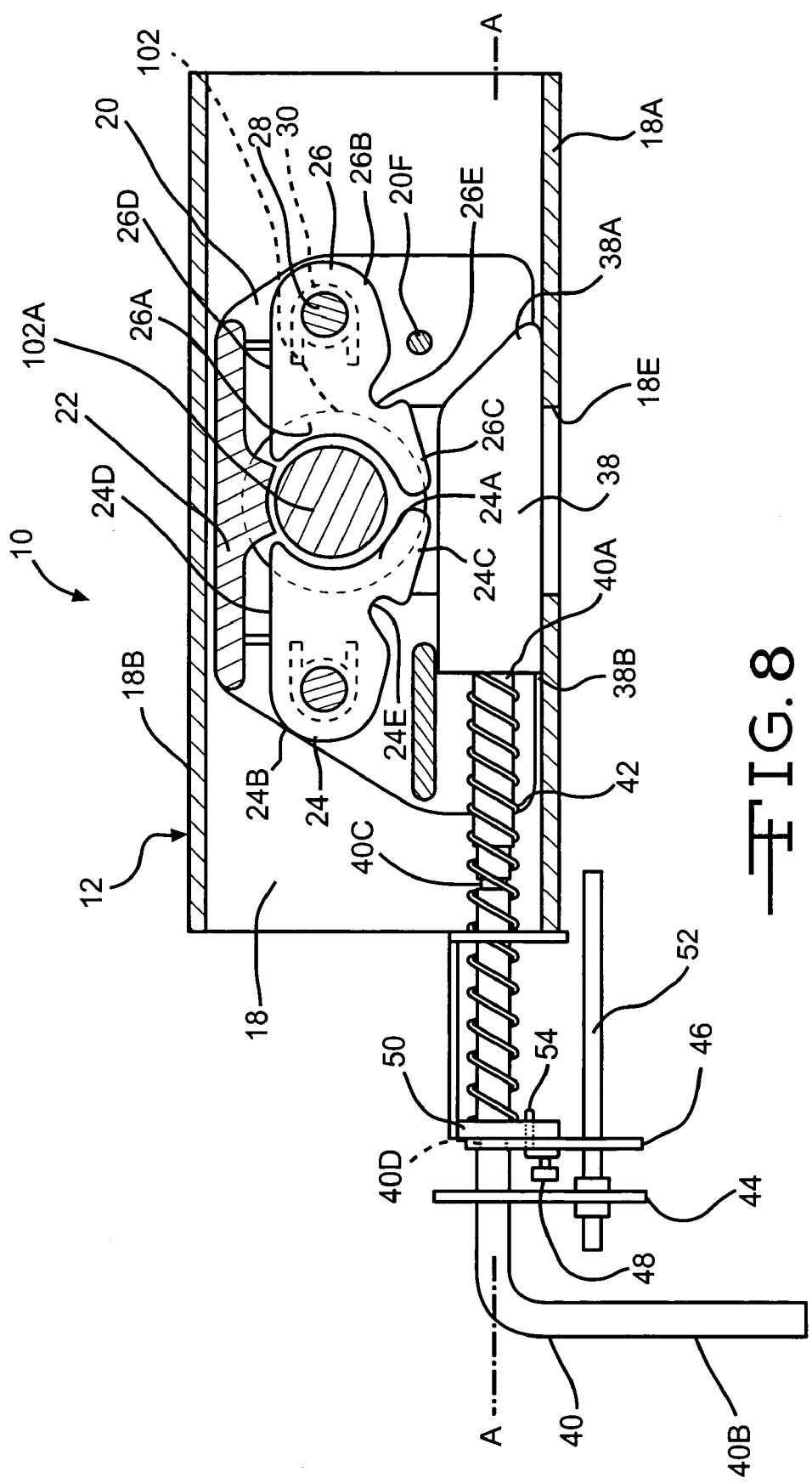
FIG. 8 is a cross-sectional view showing the locking slide bar 38 in the closed position.

Once the locking slide bar 38 is unlocked, the kingpin 102 is then moved into the head assembly 12 between the jaws 24 and 26. As the kingpin 102 moves toward the kingpin coupler 10, the body portion 102A of the kingpin 102 moves into the notches 16E, 18D and 20C and into the space between the front ends 24A and 26A of the jaws 24 and 26. Preferably, the head of the kingpin 102 is below the bottom plate 18 of the head assembly 12. If the kingpin 102 is not aligned with the notches 16E, 18D and 20C, the kingpin 102 may contact the guide plate 16C and the angled sides of the opening 16D of the guide plate 16C guide the kingpin 102 toward the notches 16E, 18D and 20C. In one (1) embodiment, the guide plate 16C allows for a successful hookup even if the kingpin 102 is initially off-center in either direction. As the kingpin 102 moves between the open jaws 24 and 26, the kingpin 102 contacts the first end 24A and 26A of the jaws 24 and 26 adjacent the inner side 24D and 26D. In one (1) embodiment, when the jaws 24 and 26 are in the open position, the first end 24A and 26A of the jaws 24 and 26 adjacent the inner side 24D and 26D of the jaws 24 and 26 extend into the notches 16E, 18D and 20C. As the kingpin 102 continues to move toward the back wall of the head assembly 12, the kingpin 102 moves further between the jaws 24 and 26 which pivots the jaws 24 and 26 toward the closed position. When the kingpin 102 is completely between the jaws 24 and 26 and the jaws 24 and 26 are in the closed position, the kingpin 102 is in contact with the curved, front surface of the kingpin stop 22 and the first ends 24A and 26A of the jaws 24 and 26 essentially encircle the body portion 102A of the kingpin 102 (FIG. 4). In one (1) embodiment, the first ends 24A and 26A of the jaws 24 and 26 encircle less than 100% of the outer circumference of the body portion 102A of the kingpin 102. As the jaws 24 and 26 move into the closed position, the front ends 24A and 26A of the jaws 24 and 26 move out of the path of the locking slide bar 38. When the jaws 24 and 26 move out of the path and the jaw 24 or 26 moves out of contact with the first end 38A of the locking slide bar 38, the force of the spring 42 of the locking slide bar 38 moves the locking slide bar 38 into the closed position without further assistance from the user (FIGS. 4 and 8). In the closed position, the locking slide bar 38 extends completely across the notches 16E, 18D and 20C and across the front ends 24A and 26A of the jaws 24 and 26. In one (1) embodiment, in the closed position, the outer side 24C and 26C of the jaws 24 and 26 adjacent the first end 24A and 26A contacts the locking slide bar 38. Once the locking slide bar 38 moves into the fully closed position, the spring 42 of the locking lever 46 moves the locking lever 46 into the second concentric groove 40D and locks the handle 40 and locking slide bar 38 to which it is attached in the closed position.

In one (1) embodiment, once the locking slide bar 38 is in the open, unlocked position, the handle 40 is rotated back to the locked position. Thus, when the locking slide bar 38 automatically moves to the closed position, the locking lever 46 automatically moves into the second concentric groove 40D and locks the locking mechanism. Preferably, a single user is able to connect the kingpin trailer to the kingpin coupler 10. To provide additional security, chains (not shown) can be provided which extend between the kingpin trailer and the towing vehicle 106 to further prevent the kingpin coupler 10 from becoming disconnected from the kingpin 102.

To unhook the kingpin coupler 10, the second end 40B of the handle 40 is grasped and rotated axially in a counterclockwise direction. In one (1) embodiment, the handle 40 is of such a length that a user is able to grasp and rotate the handle 40 without entering the bed 106A of the truck 106. This allows for quick and easy uncoupling of the trailer from the towing truck 106 by a single user. Rotating the handle 40 unlocks the locking mechanism by moving the locking lever 46 out of the second concentric groove 40D. The user then pulls on the handle 40 exerting a force in a direction opposite the head assembly 12 of the kingpin coupler 10. The user continues to pull until the first concentric groove 40C of the handle 40 is adjacent the locking lever 46 and the locking slide bar 38 does not extend across the notches 16E, 18D and 20C. The user then rotates the second end 40B back to the original orientation which moves the locking lever 46 into the first concentric groove 40C and locks the locking mechanism in the open position. Alternatively, the user can immediately rotate the second end 40B of the handle 40 once the second concentric groove 40D is no longer aligned with the locking lever 46. In this configuration, the locking lever 46 automatically moves into the first concentric groove 40C as soon as the first concentric groove 40C is aligned with the locking lever 46. The torsion spring 54 of the locking lever 46 biases the locking lever 46 into the concentric groove 40C or 40D and the locked position whenever the handle 40 is rotated into the automatic, locked position and a concentric groove 40C or 40D is aligned with the locking lever 46.

Once the locking slide bar 38 is in the open position, the kingpin 102 can be moved out of the space between the jaws 24 and 26. As the kingpin 102 is removed, the force of the kingpin 102 on the first end 24A and 26A of the jaws 24 and 26 adjacent the outer side 24C and 26C and the force of the springs 30 around the pivot pins 28 move the jaws 24 and 26 into the open position. The springs 30 act to keep the jaws 24 and 26 in the open position, once the kingpin 102 has been removed.

It is intended that the foregoing description be only illustrative of the present invention and that the present invention be limited only by the hereinafter appended claims.

I claim:

1. A coupling device for mounting on a towing vehicle for connecting a towed vehicle having a kingpin to the towing vehicle, which comprises:
   (a) a plate having a first end and a second end with a first surface and a second surface extending therebetween with the second surface attached to the towing vehicle;
   (b) a pair of jaws each having an outer side and an inner side with a first end extending therebetween and pivotally mounted adjacent the first surface of the plate such that the outer side of the jaws is adjacent the first end of the plate and a space is provided between the jaws, wherein in an open position, the first ends of the jaws are spaced apart, and wherein when the kingpin is moved between the spaced apart, first ends of the jaws into the space between the jaws, the kingpin contacts the jaws at the inner side of the jaws and pivots the jaws into a closed position such that the first ends of the jaws move towards each other;
   (c) a stop mounted adjacent the inner sides of the jaws such that when the jaws are in the closed position and the inner sides of the jaws are spaced apart, the stop extends between the spaced apart inner sides of the jaws;
   (d) a locking slide bar mounted adjacent the outer sides of the jaws such that in a closed position with the jaws in the closed position, the locking slide bar extends adjacent the outer sides of the jaws and prevents the jaws from pivoting into the open position;
   (e) a locking lever having a first end and a second end and pivotally mounted adjacent the locking slide bar and having a biasing means which biases the locking lever into a locked position; and
   (f) a handle attached to the locking slide bar, wherein the second end of the locking lever is connected to the handle such that when the handle is rotated, the first end of the locking lever is moved into and out of contact with the handle to lock and unlock the locking slide bar to which the handle is attached.

2. The coupling device of claim 1 wherein the locking slide bar has a biasing means which tends to bias the locking slide bar into the closed position.

3. The coupling device of claim 2 wherein the biasing means is a compression spring.

4. The coupling device of claim 1 wherein when the locking slide bar is in an unlocked, open position at least one of the pair of jaws is in a path of the locking slide bar and prevents the locking slide bar from moving to the closed position wherein as the jaws are pivoted to the closed position, at least one of the pair of jaws moves out of the path of the locking slide bar and allows the locking slide bar to move into the closed position.

5. The coupling device of claim 1 wherein each of the pair of jaws has a torsion spring which biases the jaw into the open position.

6. The coupling device of claim 1 wherein the locking slide bar has a first biasing means tending to move the locking slide bar into the closed position, wherein each of the pair of jaws has a second biasing means tending to move the jaws into the open position and wherein when the jaws are in the open position, a force of the second biasing means of the jaws acts against a force of the first biasing means of the locking slide bar to prevent the locking slide bar from moving into the closed position.

7. The coupling device of claim 1 wherein each of the first ends of the jaws has a curved shape and wherein as the kingpin is moved into the space between the jaws, the kingpin contacts the first ends of the jaws at the inner side and pivots the jaws to the closed position.

8. The coupling device of claim 1 wherein the pair of jaws are identical and are mounted such as to be mirror images of each other.

9. The coupling device of claim 1 wherein the handle and locking lever are connected together by a trip rod and wherein the handle is rotated to lock and unlock the locking slide bar.

10. The coupling device of claim 1 wherein the handle has a first groove and a second groove wherein when the locking slide bar is in a locked, open position, the first end of the locking lever is in the first groove and wherein when the locking slide bar is in a locked, closed position, the first end of the locking lever is in the second groove of the handle.

11. The coupling device of claim 1 wherein the handle is rotatably mounted on the locking slide bar and a spring is mounted around the handle and wherein the spring acts to move the locking slide bar into the closed position such that the locking slide bar is adjacent the jaws.

12. The coupling device of claim 1 wherein the handle is rotatably mounted on the locking slide bar and a spring is mounted around the handle adjacent the locking slide bar and wherein the spring acts to move the locking slide bar into the closed position such that the locking slide bar is adjacent the first end of the jaws.

13. A coupling device for mounting on a towing vehicle for connecting a towed vehicle having a kingpin to the towing vehicle, which comprises:
    (a) a housing having an open first end and configured to be connected to the towing vehicle;
    (b) a pair of jaws pivotally mounted on the housing such that when the kingpin is moved into the open first end of the housing, the kingpin contacts the jaws and pivots the jaws between an open position and a closed position wherein when in the open position, the jaws do not block the open first end of the housing and wherein in the closed position, the jaws block the open first end of the housing;
    (c) a locking slide bar slidably mounted on the housing adjacent the open first end and configured to slide to a closed position across the open first end of the housing to block the open first end of the housing, wherein when the locking slide bar is in the closed position, the jaws are in the closed position and wherein in the closed position, the locking slide bar and the pair of jaws prevent the kingpin from moving out of the open first end of the housing; and
    (d) a handle rotatably mounted on the locking slide bar with a locking lever having a first end and a second end and Pivotally mounted adjacent the locking slide bar and having a biasing means which biases the locking lever into the locked position, the second end of the locking lever connected to the handle for locking the locking slide bar in a locked, closed position or a locked, open position wherein the first end of the locking lever is moved into and out of contact with the handle between a locked position and an unlocked position by axially rotating the handle.

14. The coupling device of claim 13 wherein a guide is mounted on the housing adjacent the open first end and wherein the guide acts to guide the kingpin in a direction toward the open first end of the housing.

15. The coupling device of claim 13 wherein the locking slide bar has a biasing means which tends to bias the locking slide bar into the closed position.

16. The coupling device of claim 15 wherein when the locking slide bar is in an unlocked, open position, at least one of the pair of jaws is in a path of the locking slide bar and prevents the locking slide bar from moving to the closed position wherein as the jaws are pivoted to the closed position, at least one of the pair of jaws moves out of the path of the locking slide bar and allows the locking slide bar to move into the closed position.

17. The coupling device of claim 13 wherein each of the pair of jaws has a spring which biases the jaws into the open position.

18. The coupling device of claim 13 wherein the locking slide bar has a first biasing means tending to move the locking slide bar into the closed position, wherein each of the pair of jaws has a second biasing means tending to move the jaws into the open position and wherein when the jaws are in the open position and the locking slide bar is in an unlocked, open position, a force of the second biasing means of one of the jaws acts against a force of the first biasing means of the locking slide bar and acts to prevent the locking slide bar from moving into the closed position.

19. The coupling device of claim 13 wherein each of the jaws has an outer side and an inner side with a curved first end spaced between the sides and wherein when the jaws are in the open position and the kingpin is moved between the jaws, the kingpin contacts the first ends of the jaws at the inner sides and pivots the jaws to the closed position.

20. The coupling device of claim 13 wherein the pair of jaws are identical and are mounted such as to be mirror images of each other.

21. The coupling device of claim 13 wherein the handle and locking lever are connected together by a trip rod and wherein the handle is rotated in a counterclockwise direction to lock and unlock the locking slide bar.

22. The coupling device of claim 13 wherein the handle has a first groove and a second groove wherein when the locking slide bar is in the locked, open position, the first end of the locking lever is in the first groove of the handle and wherein when the locking slide bar is in the locked, closed position, the first end of the locking lever is in the second groove of the handle.

23. The coupling device of claim 13 wherein a spring is mounted around the handle and wherein the spring acts to move the locking slide bar into the closed position such that the locking slide bar is adjacent the jaws.

24. The coupling device of claim 13 wherein the towing vehicle is a truck and wherein the coupling device is mounted in a bed of the truck and wherein the handle is of a length such that the handle can be rotated from the bed of the truck.

25. The coupling device of claim 13 wherein the jaws have an outer side and an inner side with a curved first end spaced therebetween and wherein when the jaws are in the open position, the first end of the jaws are spaced apart at least a distance equal to a diameter of a portion of the kingpin.

26. The coupling device of claim 25 wherein the first ends of the jaws are in a closely spaced relationship to each other when in the closed position and extend around the portion of the kingpin adjacent the opening in the housing.

27. A coupling device for mounting on a towing vehicle for connecting a towed vehicle having a kingpin to the towing vehicle, which comprises:
   (a) a housing having an open first end and configured to be mounted on the towing vehicle;
   (b) a pair of jaws pivotally mounted on the housing such that when the kingpin is moved into the open first end of the housing, the kingpin contacts the jaws and pivots the jaws between an open position and a closed position wherein when in the open position, the jaws do not block the open first end of the housing and wherein in the closed position, the jaws block the open first end of the housing;
   (c) a locking slide bar slidably mounted on the housing adjacent the open first end and configured to slide to a closed position across the open first end of the housing to block the open first end of the housing, wherein when the locking slide bar is in the closed position, the jaws are in the closed position and wherein in the closed position, the locking slide bar and the pair of jaws prevent the kingpin from moving out of the open first end of the housing;
   (d) a handle rotatably mounted on the locking slide bar; and
   (e) a locking lever having a first end and a second end and pivotally mounted adjacent the locking slide bar and having a biasing means which biases the locking lever into a locked position, wherein the second end of the locking lever is connected to the handle such that when the handle is rotated, the first end of the locking lever is moved into and out of contact with the handle to lock and unlock the locking slide bar to which the handle is attached.

28. The coupling device of claim 27 wherein a spring is mounted around the handle and wherein the spring acts to move the locking slide bar into the closed position such that the locking slide bar is adjacent the jaws.

29. A method for coupling a towed vehicle having a kingpin to a towing vehicle, which comprises the steps of:
   (a) providing a coupling device mounted on the towing vehicle, the coupling device including a housing having an open, first end and configured to be mounted on the towing vehicle; a pair of jaws pivotally mounted on the housing such that when the kingpin is moved into the open, first end of the housing, the kingpin contacts the jaws and pivots the jaws between an open position and a closed position, wherein when in the open position, the jaws do not block the open first end of the housing and when in the closed position, the jaws extend around the kingpin adjacent the open first end and block the open first end of the housing; a locking slide bar slidably mounted on the housing adjacent the open, first end and configured to slide to a closed position across the open first end of the housing to block the open first end of the housing; and a locking lever having a first end and a second end and pivotally mounted adjacent the locking slide bar and having a biasing means which biases the locking lever into a locked position, wherein a handle is attached to the locking slide bar, wherein the second end of the locking lever is connected to the handle such that when the handle is rotated, the first end of the locking lever is moved into and out of contact with the handle to lock and unlock the locking slide bar to which the handle is attached; and
   (b) moving the kingpin essentially horizontally into the open, first end of the housing of the coupling device with the jaws in the open position wherein as the kingpin contacts the jaws, the jaws pivot to the closed position and the locking slide bar moves to the closed position such that the locking slide bar prevents the kingpin from moving out of the housing when the towed vehicle is being towed and wherein the biasing means of the locking lever moves the first end of the locking lever into contact with the handle to lock the locking slide bar.

30. The method of claim 29 wherein to release the kingpin, the handle is rotated and the first end of the locking lever is moved out of contact with the handle and the locking slide bar is moved to a locked, open position such that the locking slide bar does not extend across the open, first end of the housing and the first end of the locking lever is in contact with the handle and the kingpin is moved essentially horizontally toward the open, first end of the housing and contacts the jaws which moves the jaws into the open position.

31. The method of claim 29 wherein the handle is rotatable mounted on the locking slide bar and wherein before step (b), the locking slide bar is moved from a locked, open position to an unlocked, open position wherein to unlock the locking slide bar, the handle is rotated about a longitudinal axis of the locking slide bar which moves the locking means into an unlocked position wherein when the locking means moves into the unlocked position, the locking slide bar moves to the unlocked, open position and wherein in the unlocked, open position, at least one of the pair of jaws is in a path of the locking slide bar and prevents the locking slide bar from moving to the closed position wherein as the jaws are pivoted to the closed position, at least one of the pair of jaws moves out of the path of the locking slide bar and allows the locking slide bar to move into the closed position.

32. The method of claim 31 wherein the towing vehicle is a pickup truck having a bed and wherein the coupling device is mounted in the bed of the pickup truck and wherein the handle is of a length such that the handle can be rotated to unlock the locking slide bar from the bed of the pickup truck.

33. A coupling device for mounting on a towing vehicle for connecting a towed vehicle having a kingpin to the towing vehicle, which comprises:
   (a) a housing with an open first end and having a top plate connected to and spaced apart from a bottom plate forming a chamber, wherein the bottom plate is configured to be connected to the towing vehicle;
   (b) a casting having a top section spaced above and connected to a bottom section with a space therebetween and mounted in the chamber of the housing such that the top section is adjacent to the top plate and the bottom section is adjacent the bottom plate;
   (c) a pair of jaws pivotally mounted in the space between the top and bottom sections of the casting such that when the kingpin is moved into the open first end of the housing, the kingpin contacts the jaws and pivots the jaws between an open position and a closed position wherein when in the open position, the jaws do not block the open first end of the housing and wherein in the closed position, the jaws block the open first end of the housing;

(d) a locking slide bar slidably mounted on the housing adjacent the open first end and configured to slide to a closed position across the open first end of the housing to block the open first end of the housing, wherein when the locking slide bar is in the closed position, the jaws are in the closed position and wherein in the closed position, the locking slide bar and the pair of jaws prevent the kingpin from moving out of the open first end of the housing; and (e) a handle rotatably mounted on the locking slide bar.

34. The coupling device of claim 33 wherein the casting is mounted in the housing by pins such that the casting can be easily and quickly removed from the housing.

35. The coupling device of claim 34 wherein the pins are two flat head bolts which attach through the housing and the casting.

36. The coupling device of claim 34 wherein the pivoting jaws are mounted in the casting by the pins.

* * * * *